(12) United States Patent
Lee et al.

(10) Patent No.: US 7,262,952 B2
(45) Date of Patent: Aug. 28, 2007

(54) MULTILAYER CHIP CAPACITOR

(75) Inventors: Byoung Hwa Lee, Kyungki-do (KR); Chang Hoon Shim, Kyungki-do (KR); Hae Suk Chung, Seoul (KR); Dong Seok Park, Seoul (KR); Sang Soo Park, Kyungki-do (KR); Min Cheol Park, Kyungki-do (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 11/453,880

(22) Filed: Jun. 16, 2006

(65) Prior Publication Data

US 2006/0285271 A1 Dec. 21, 2006

(30) Foreign Application Priority Data

Jun. 17, 2005 (KR) ...................... 10-2005-0052562

(51) Int. Cl.
 *H01G 4/228* (2006.01)
(52) U.S. Cl. ................. 361/306.3; 361/306.1; 361/307; 361/308.1; 361/311; 361/313; 361/321.1
(58) Field of Classification Search ............. 361/306.3, 361/301.2, 301.4, 307, 308.1, 306.1, 306.2, 361/309–313, 321.1, 321.2, 303–305
 See application file for complete search history.

(56) References Cited

U.S. PATENT DOCUMENTS

| | | | | |
|---|---|---|---|---|
| 5,880,925 | A | 3/1999 | Dupre et al. | |
| 6,441,459 | B1 * | 8/2002 | Togashi et al. | 257/532 |
| 6,661,644 | B2 * | 12/2003 | Shimada et al. | 361/508 |
| 6,885,544 | B2 * | 4/2005 | Kim et al. | 361/321.1 |
| 6,934,145 | B2 * | 8/2005 | Hsieh et al. | 361/321.2 |
| 6,940,710 | B1 * | 9/2005 | Lee et al. | 361/321.2 |
| 7,046,500 | B2 * | 5/2006 | Lee et al. | 361/303 |
| 7,050,288 | B2 * | 5/2006 | Ahiko et al. | 361/303 |
| 7,196,897 | B2 * | 3/2007 | Togashi et al. | 361/306.3 |

* cited by examiner

*Primary Examiner*—Nguyen T. Ha
(74) *Attorney, Agent, or Firm*—McDermott Will & Emery LLP

(57) ABSTRACT

The invention provides a multilayer chip capacitor reduced in ESL. A capacitor body has a plurality of dielectric layers stacked in a thickness direction. A plurality of first and second internal electrodes are separated from one another by the dielectric layers within the capacitor body. Each of the first internal electrodes opposes each of the second internal electrodes. Each of the first and second internal electrodes includes at least two leads extending toward any side of the capacitor body. Also, a plurality of external electrodes are formed on an outer surface of the capacitor body and connected to the internal electrodes via the leads. Further, vertically adjacent ones of the leads having the same polarity extend in different directions at a predetermined angle. The leads of the first and second internal electrodes are disposed adjacent to and alternate with those of the second internal electrodes.

14 Claims, 17 Drawing Sheets

MULTILAYER CHIP CAPACITOR

CLAIM OF PRIORITY

This application claims the benefit of Korean Patent Application No. 2005-52562 filed on Jun. 17, 2005 in the Korean Intellectual Property Office, the disclosure of which is incorporated herein by reference.

BACKGROUND OF THE INVENTION

1. Field of the Invention

The present invention relates to a multilayer chip capacitor, more particularly, which is suitably used as a decoupling capacitor of a Micro Processor Unit (MPU) and is capable of reducing Equivalent Series Inductance (ESL).

2. Description of the Related Art

In general, a multilayer chip capacitor (MLCC) includes a plurality of dielectric layers made of ceramics, and internal electrodes interleaved therebetween. The multilayer chip capacitor is small-sized and capable of high capacitance, thus broadly used as capacitive parts of various electronic devices. Especially, the multilayer chip capacitor is extensively used as a decoupling capacitor installed between a semiconductor chip and an electric source in power supply circuits such as a Large Scale Integration (LSI) device.

The capacitor used as the decoupling capacitor needs to have lower ESL to inhibit rapid current change and stabilize the power supply circuits. Higher-frequency and higher-current trend of the MPU has increased such demand. A method for reducing ESL of the multilayer chip capacitor is disclosed in U.S. Pat. No. 5,880,925. The document teaches a method for disposing leads of a positive internal electrode adjacent to those of a negative internal electrode in an interdigitated arrangement. As an example of the conventional technique, FIGS. 1a to 1c show a multilayer chip capacitor in which adjacent leads of first and second internal electrodes having the opposite polarity are disposed alternately.

FIG. 1a is an exploded perspective view illustrating an internal electrode structure of a conventional multilayer chip capacitor. FIG. 1b is a perspective view illustrating the exterior of a conventional multilayer chip capacitor 10 employing the internal electrode structure of FIG. 1a. FIG. 1c is a perspective view illustrating a partial internal structure of the multilayer chip capacitor of FIG. 1b. Dielectric layers 11a, 11b, 12a and 12b are not illustrated in FIG. 1c. Referring to FIGS. 1a and 1b, first internal electrodes 13 (13a, 13b) are formed on respective dielectric layers 11a, 11b and second internal electrodes 14 (14a, 14b) are formed on respective dielectric layers 12a and 12b. Four leads 15a, 15b, 16a and 16b are formed on the respective electrodes 13a, 13b, 14a and 14b. These dielectric layers are stacked alternately to constitute a capacitor body 20. To manufacture the multilayer chip capacitor 10, the capacitor body 20 is compressed and fired, and in addition, external terminal electrodes 17 and 18 are formed to connect to the respective leads 15a, 15b, 16a and 16b.

At this time, the first internal electrodes 13a and 13b exhibit the same polarity (likewise, the second internal electrodes 14a and 14b exhibit the same polarity), however the opposite polarity with respect to the second internal electrodes 14a and 14b. In the adjacent leads 15a and 16a having the opposite polarity, currents flow in opposite directions as indicated with an arrow (see reference sign 1a).

Therefore, magnetic flux generated by a high-frequency current is partially cancelled, decreasing ESL of the capacitor 10.

As shown in FIG. 1c, the vertically adjacent two leads of the first internal electrodes 13a and 13b extend in parallel (in the same direction) to an external electrode 17. Thus, as shown in FIG. b, in the vertically adjacent leads 15a and 15b having the same polarity 5a and 15b, currents flow in the same direction (indicated with an arrow). In this fashion, currents flowing in the same direction through the leads 15a, 15b generate strong mutual inductance. This mutual inductance renders it hard to reduce ESL sufficiently. To be used as the decoupling capacitor for the MPU, the multilayer chip capacitor needs to exhibit lower ESL.

SUMMARY OF THE INVENTION

The present invention has been made to solve the foregoing problems of the prior art and therefore an object of certain embodiments of the present invention is to provide a multilayer chip capacitor with reduced ESL.

According to an aspect of the invention for realizing the object, there is provided a multilayer chip capacitor comprising: a capacitor body having a plurality of dielectric layers stacked in a thickness direction; a plurality of first and second internal electrodes separated from one another by the dielectric layers within the capacitor body, each of the first internal electrodes opposing each of the second internal electrodes, each of the first and second internal electrodes including at least two leads extending toward any side of the capacitor body; a plurality of external electrodes formed on an outer surface of the capacitor body and connected to the internal electrodes via the leads, wherein vertically adjacent ones of the leads having the same polarity extend in different directions at a predetermined angle, and wherein the leads of the first internal electrodes are disposed adjacent to and alternate with those of the second internal electrodes.

According to one embodiment of the invention, the vertically adjacent leads of the same polarity extend in different directions at an angle of 45 degree. The vertically adjacent leads of the same polarity may extend in different directions at a right angle.

According to further another embodiment of the invention, the capacitor body includes an upper dummy layer and a lower dummy layer, wherein the first and second internal electrodes are disposed between the upper and lower dummy layers, and wherein the lower dummy layer has a thickness smaller than that of the upper dummy layer. Preferably, the thickness ratio of the lower dummy layer to the upper dummy layer is 0.8 or less. At this time, preferably, the capacitor body has a marking formed on an upper surface thereof, for distinguishing the upper surface from a lower surface of the capacitor. The marking may be formed of e.g., a colored glass.

According to further another embodiment of the invention, at least one of the first and second internal electrodes has at least one slit formed therein. The slit lengthens a current path and consequently prevents excessive reduction in Equivalent Series Resistant (ESR).

According to further another embodiment of the invention, each of the first and second internal electrodes comprises a pair of separated rectangular conductive patterns disposed adjacent to each other, wherein each of the pair of conductive patterns has at least one slit extending from at least one side of the conductive pattern toward a central portion of the conductive pattern so as to change current flow within the conductive pattern, and wherein currents flow in opposite directions in adjacent areas of the pair of conductive patterns. Also, the pair of conductive patterns have the same or opposite polarity.

According to further another embodiment of the invention, currents flowing in the first and second internal electrodes cross each other perpendicularly. In this case, each of the first internal electrodes has a rectangular first conductive pattern with two slits extending from two opposing sides of the first conductive pattern toward a central portion of the first conductive pattern, and each of the second internal electrodes has a rectangular second conductive pattern with two slits extending from two opposing sides of the second conductive pattern toward a central portion of the second conductive pattern, the slits of the second internal electrodes crossing perpendicularly the slits of the first internal electrodes.

Alternatively, each of the first internal electrodes has a pair of first conductive patterns divided by a first slit, and each of the second internal electrodes has a rectangular second conductive pattern with two second slits extending from two opposing sides of the second conductive pattern toward a central portion of the second conductive pattern, the second slits crossing perpendicularly the first slits.

Alternatively, each of the first internal electrodes has a first conductive pattern, and each of the second internal electrodes has a pair of second conductive patterns divided by a slit.

According to the invention, vertically adjacent ones of the leads having the same polarity extend in different directions at a predetermined angle. Therefore, currents flow through the leads in different directions. This minimizes increase in magnetic flux and prevents mutual inductance from occurring as in the prior art. Consequently, the multilayer chip capacitor has much lower ESL.

BRIEF DESCRIPTION OF THE DRAWINGS

The above and other objects, features and other advantages of the present invention will be more clearly understood from the following detailed description taken in conjunction with the accompanying drawings, in which:

FIG. 1b is a perspective view illustrating the exterior of a conventional multilayer chip capacitor employing the internal electrodes of FIG. 1a;

DETAILED DESCRIPTION OF THE PREFERRED EMBODIMENT

Figure 1A:
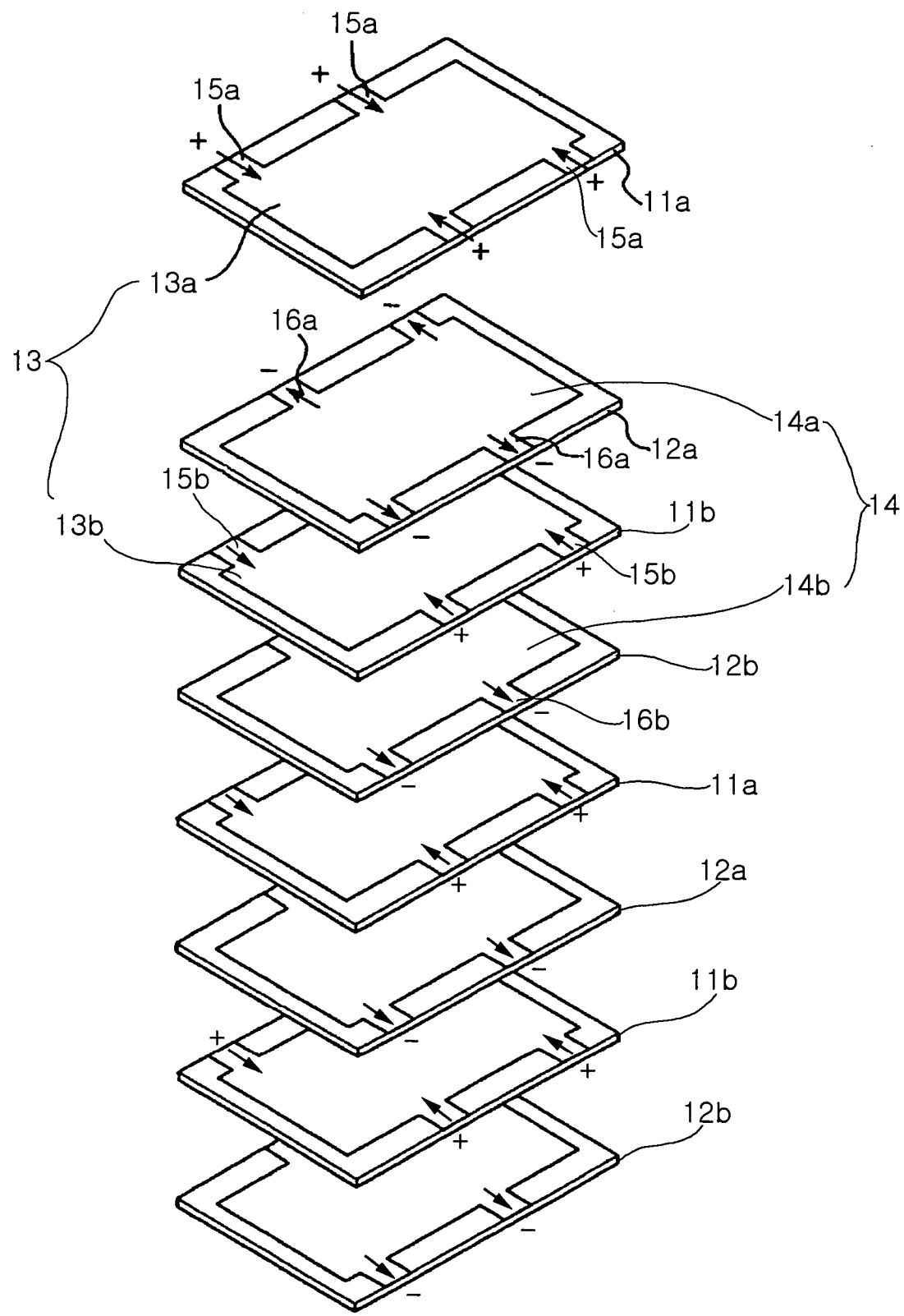
FIG. 1a is an exploded perspective view illustrating an internal electrode structure of a conventional multiplayer chip capacitor.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

In the specification, major terms are defined as follows.

In the specification, a "dummy layer" is a region without internal electrodes which substantially contribute to capacitance. On the contrary, an "active layer" is a region with such internal electrodes which substantially contribute to capacitance.

A "lower dummy layer" is a dummy layer disposed between a bottom surface of the capacitor and a lowermost internal electrode. An "upper dummy layer" is a dummy layer disposed on an active layer, by which the upper dummy layer is separated from the lower dummy layer. Further, herein, a "bottom surface" or "underside" of the capacitor is a surface attached to a pad of a substrate when the capacitor is mounted on the substrate. A "top surface" of the capacitor is a surface opposing the bottom surface.

Figure 2A:
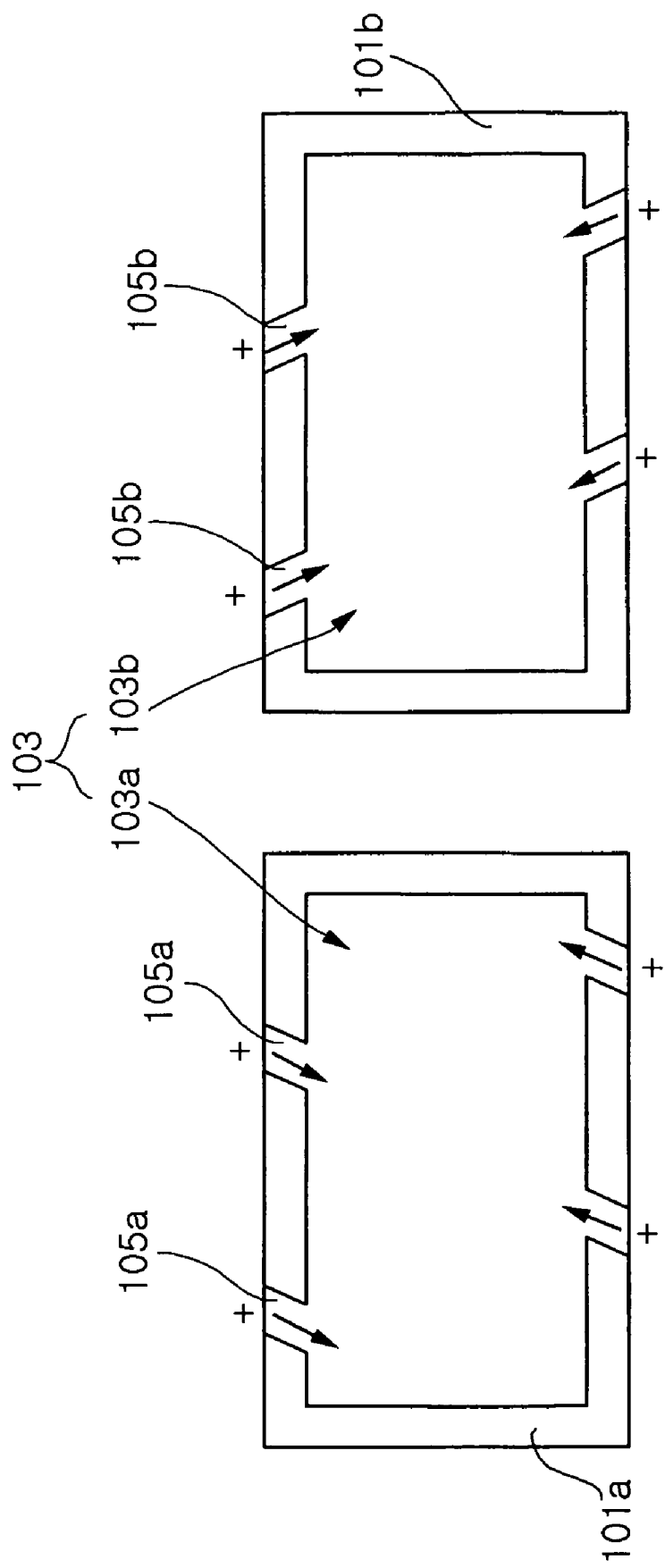
FIGS. 2a and 2b are plan views illustrating the configuration of internal electrodes according to an embodiment of the invention.
Figure 2B:
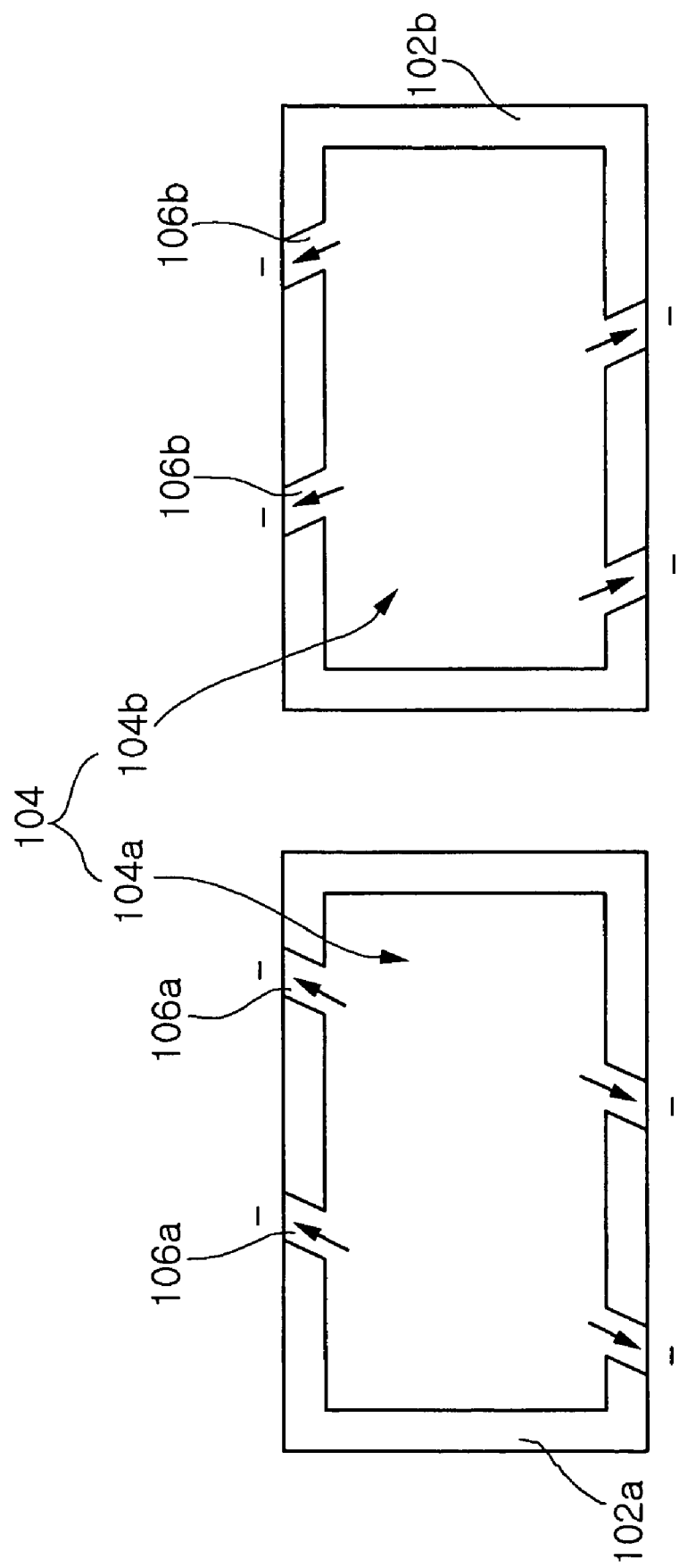
Figure 3:
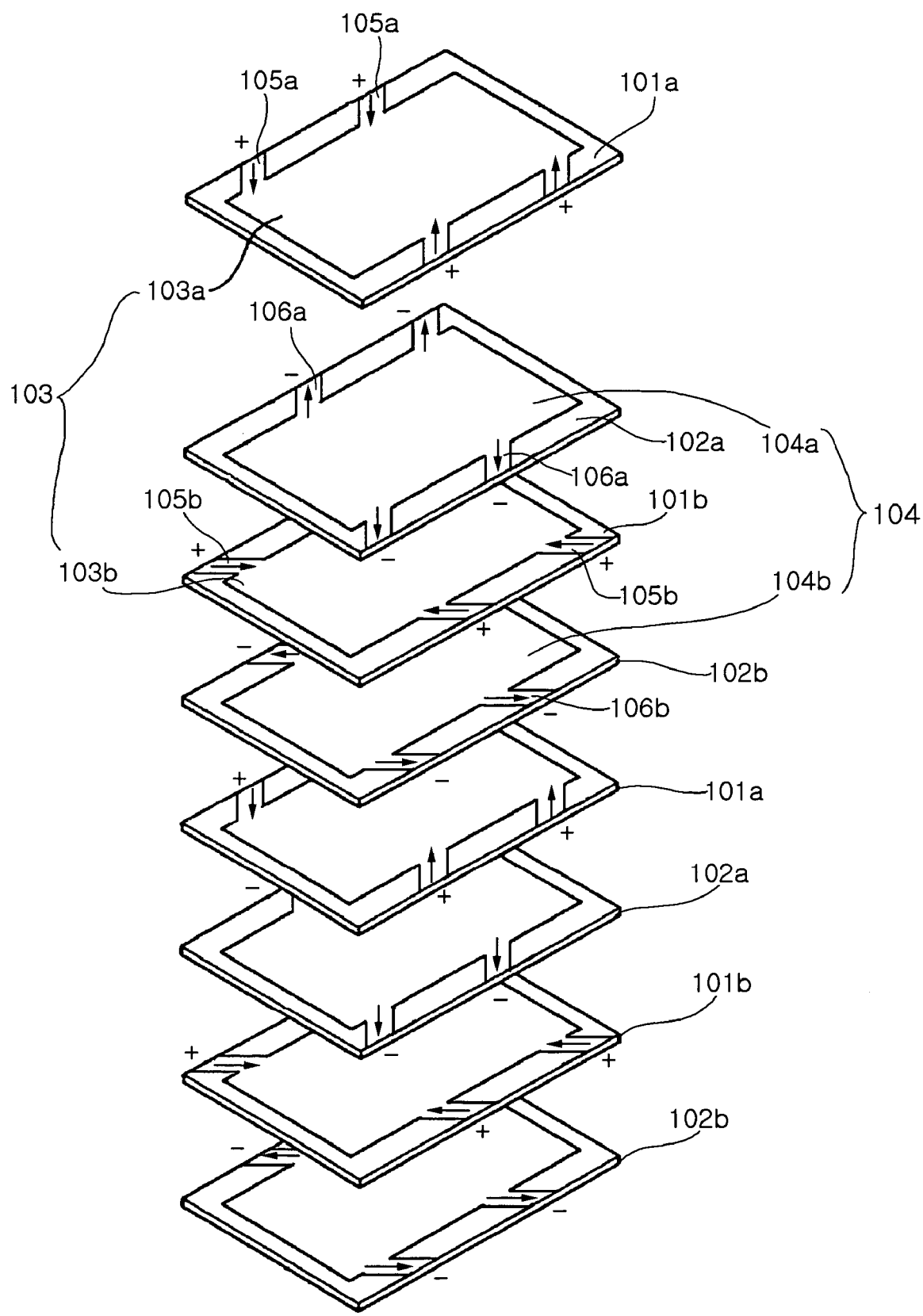
FIG. 3 is an exploded perspective view illustrating an internal electrode structure of a multilayer chip capacitor according to an embodiment of the invention.

FIGS. 2a and 2b are plan views illustrating the configuration of internal electrodes according to an embodiment of the invention. FIG. 3 is an exploded perspective view illustrating an internal electrode structure of a multilayer chip capacitor employing the internal electrodes of FIGS. 2a and 2b. FIG. 2a illustrates the configuration of first internal electrodes 103 formed on dielectric layers 101a and 101b, and FIG. 2b illustrates the configuration of second internal electrodes 104 formed on dielectric layers 102a and 102b. The first internal electrodes 103 and second internal electrodes 104 exhibit the opposite polarity during operation of the capacitor.

As shown in FIGS. 2a, 2b and 3, vertically adjacent leads having the same polarity extend in different directions at a predetermined angle. That is, a lead 105a of a first internal electrode 103a extends in a different direction at a predetermined angle from a lead portion 105b of a first electrode 103b, thus connected to an external electrode of the same polarity (e.g., positive polarity). This allows currents to flow in opposite directions in the vertically adjacent leads 105a and 105b having the same polarity (e.g., negative polarity) (refer to an arrow).

Likewise, a lead 106a of a second internal electrode 104a extends in a different direction at a predetermined angle from a lead portion 106b of a second internal electrode 104b, thus connected to an external electrode of the same polarity (e.g., positive polarity). This allows currents to flow in different directions in the vertically adjacent leads 106a and 106b having the same polarity (negative polarity) (refer to an arrow).

Figure 4:
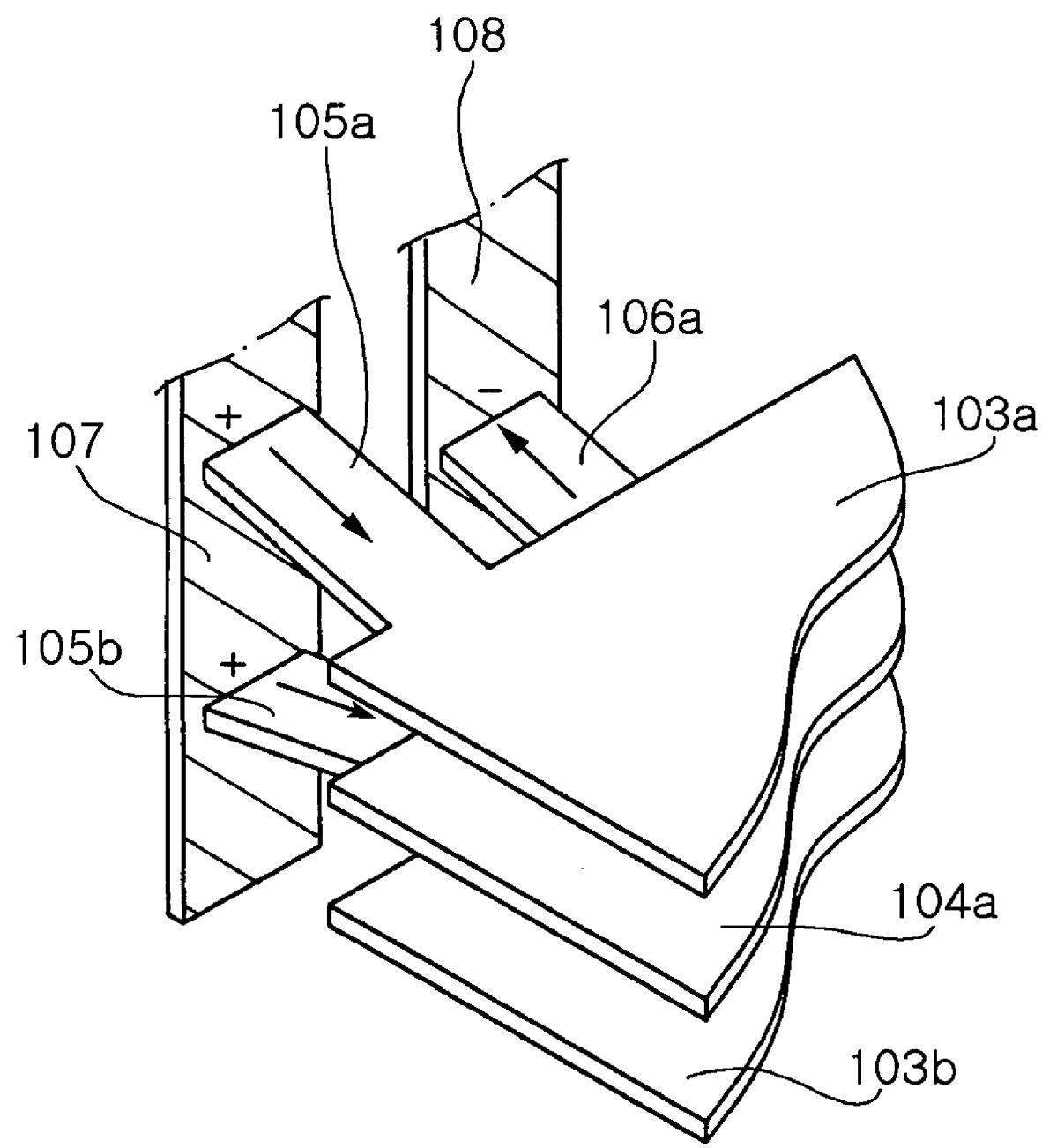
FIG. 4 is a perspective view schematically illustrating a partial internal structure of a multilayer chip capacitor according to an embodiment of the invention.

In this fashion, currents flowing in different directions in the vertically adjacent leads of the same polarity eliminate or weaken a conventional problem of mutual inductance. Preferably, the leads 105a and 105b or the leads 106a and 106b, which are vertically adjacent to each other, are oriented at an angle of 45 degree to 135 degree. For example, in case where the vertically adjacent leads having the same polarity are oriented perpendicular to each other, mutual inductance is rarely generated therebetween. FIG. 4 illustrates currents flowing in different directions in the vertically adjacent leads having the same polarity.

Figure 1B:
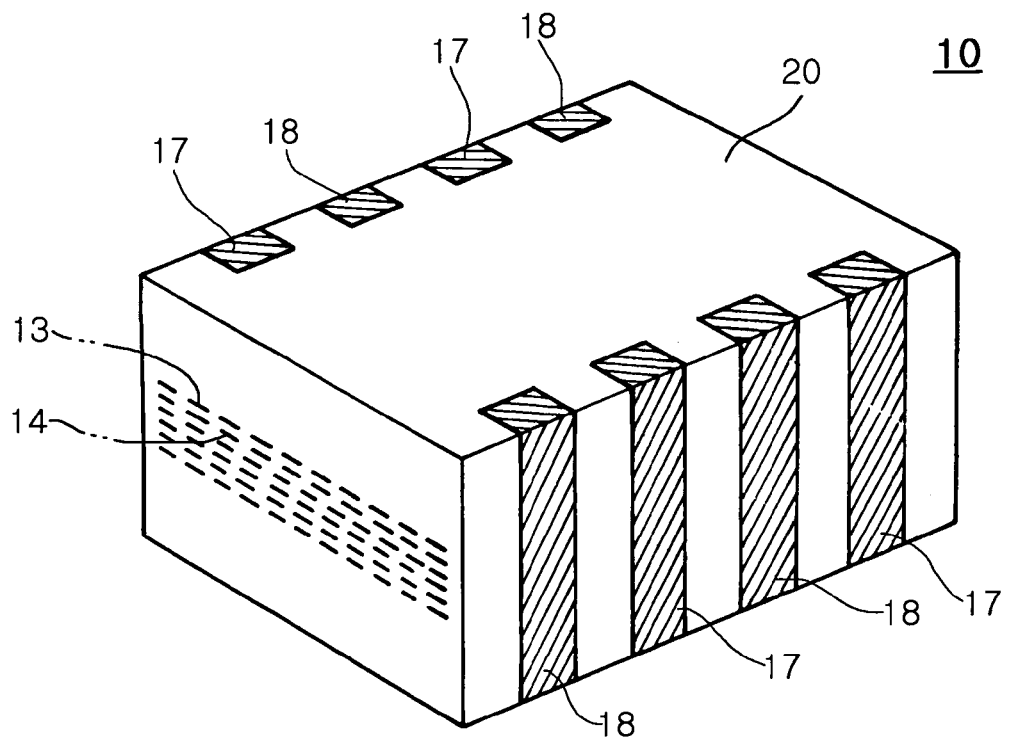
Figure 1C:
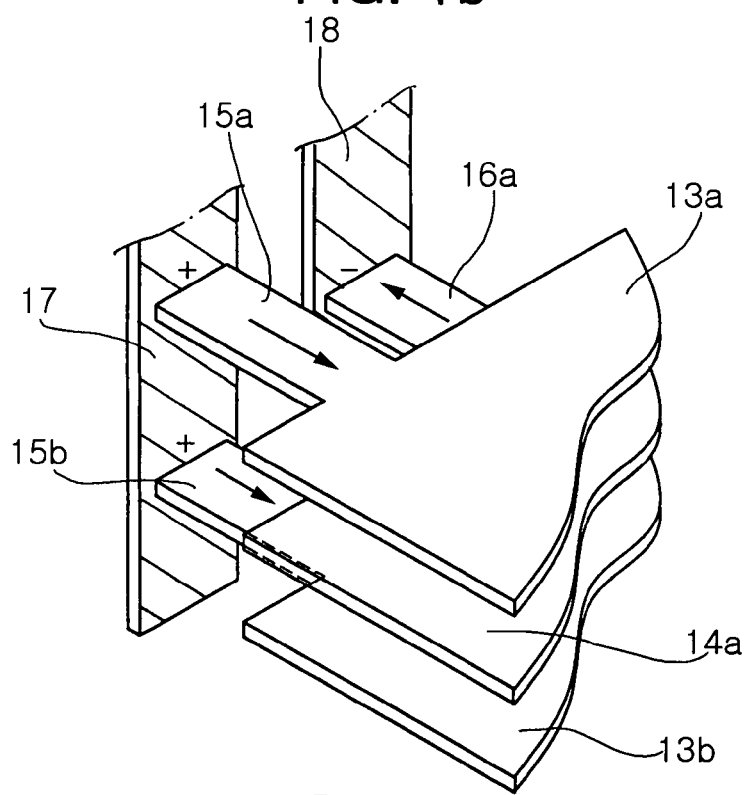
FIG. 1c is a perspective view illustrating a partial internal structure of the multilayer chip capacitor of FIG. 1b.

FIG. 4 is a perspective view illustrating a partial internal structure of a multilayer chip capacitor employing the internal electrode structure of FIG. 3. For the sake of convenience, dielectric layers are not illustrated in FIG. 4. As shown in FIG. 4, currents flow in different directions in vertically adjacent leads 105a and 105b having the same polarity (e.g., positive polarity) connected to an external electrode 107 (refer to an arrow). This prevents strong mutual inductance from occurring in the leads 105a and 105b (see FIG. 1) as in the prior art. Likewise, vertically adjacent leads 106a and 106b of second electrodes 104a and 104b extend in different directions (see FIG. 3). Consequently, strong mutual inductance does not arise in the leads 106a and 106b, thereby ensuring effects of ESL reduction. As a result of a simulation experiment, it has been confirmed that in case where the vertically adjacent leads having the same polarity are perpendicular to each other (see FIG. 3), there is about 12% decrease in ESL compared with a conventional lead structure (see FIG. 1a).

Figure 5:
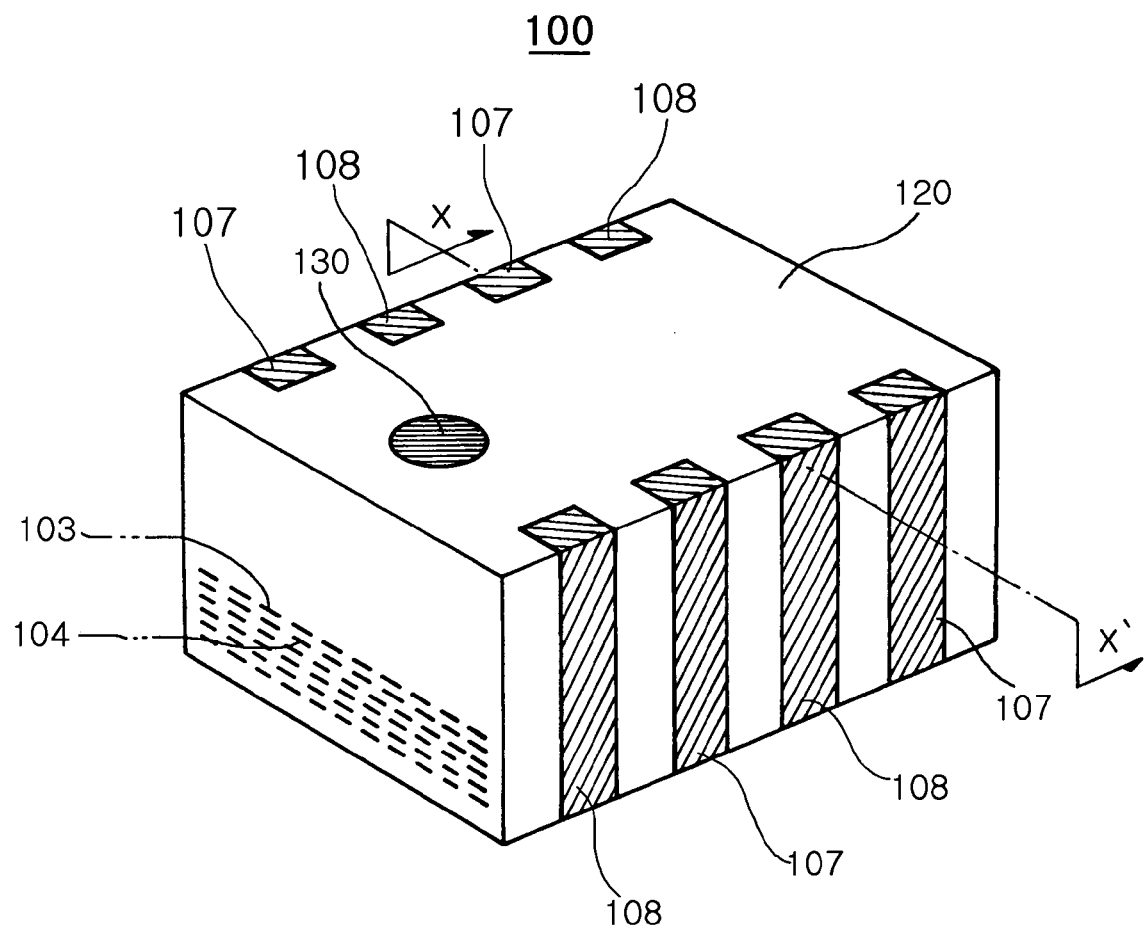
FIG. 5 is a perspective view illustrating the exterior of a multilayer chip capacitor according to an embodiment of the invention.

FIG. 5 is a perspective view illustrating an exemplary multilayer chip capacitor employing the internal electrode structure of FIG. 3. As shown in FIG. 5, the multilayer chip capacitor 100 includes a capacitor body 120 having dielectric layers 101a, 102a, 101b and 102b stacked in a thickness direction. External electrodes 107 and 108 are formed on outer surfaces of the capacitor 120. Also, first electrodes 103 and second internal electrodes 104 are stacked vertically between the dielectric layers inside the capacitor body 120. The first electrodes 103 are coupled to the external electrode 107 of the same polarity via leads 105a and 105b, while the second internal electrode 104 is coupled to the external electrode 108 of the same polarity via leads 106a and 106b.

As shown in FIG. 5, in this embodiment of the invention, especially the internal electrodes 103 and 104 are disposed in the lower part of the capacitor. This is distinguished from a conventional capacitor 10 in which internal electrodes 13 and 14 are disposed in the central part of the capacitor 20 (see FIG. 1b). As stated later, the internal electrodes 103 and 104 disposed in the lower part of the capacitor serve to further reduce ESL.

Figure 6:
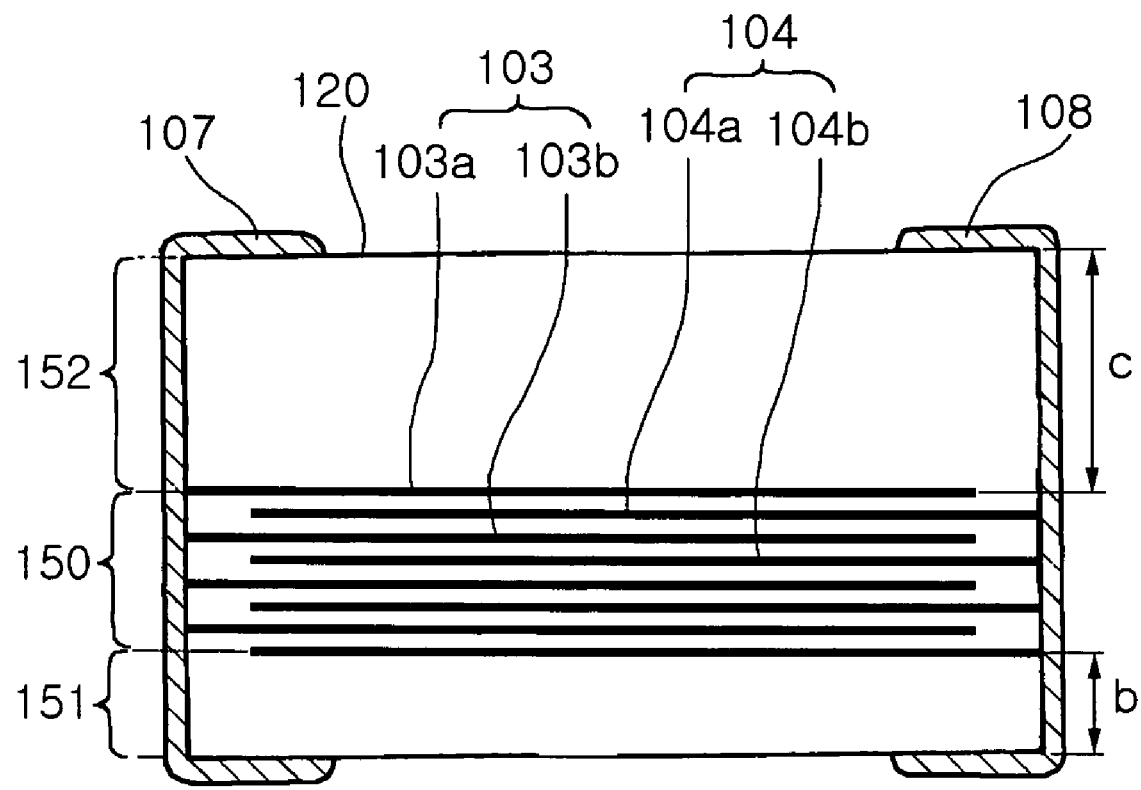
FIG. 6 is a cross-sectional view illustrating a multilayer chip capacitor taken along the line X-X' of FIG. 5.

FIG. 6 is a vertical cross-sectional view of the multilayer chip capacitor 100 taken along the line X-X' in FIG. 5. Referring to FIG. 6, a capacitor body 120 includes an upper dummy layer 152 formed on an active layer 150 and a lower dummy layer 151 formed under the active layer 150. As shown in FIG. 6, the thickness b of the lower dummy layer 151 is smaller than that of the upper dummy layer 152 so that the capacitor 100 has a vertically asymmetrical cross-section. In this fashion, the relatively smaller thickness of the lower dummy layer 151 reduces ESL, which is caused by currents traveling from a substrate pad (not illustrated), on which the capacitor is mounted, to external electrodes 107 and 108. In addition, the bigger thickness of the upper dummy layer 152 ensures the capacitor 100 to be sufficiently thick, thereby preventing deterioration in mechanical strength of the capacitor.

As described earlier, the vertically asymmetrical cross-section of the multilayer chip capacitor 100 requires distinction between the upper and lower surfaces of the capacitor 100 when the capacitor 100 is mounted on a substrate. That is, to decrease ESL properties stemming from currents traveling from the substrate pad to the external electrodes according to the invention, the capacitor 100 should be mounted on the substrate such that a lower dummy layer 151 faces the substrate pad without the upper surface of the capacitor 100 facing downward. The upper and lower surfaces of the capacitor 100 can be distinguished by a marking 130 formed on a top surface of the capacitor 100 (see FIG. 5). The marking 130 can be formed of e.g, a colored glass material.

Also, the multilayer chip capacitor according to the invention may employ an internal electrode structure capable of further reducing ESL and controlling ESR not to be extremely low. This internal electrode structure has at least one slit formed therein.

FIGS. 7a to 12b are plan views illustrating various embodiments for internal electrodes that can be provided in a multilayer chip capacitor according to the invention.

Figure 7A:
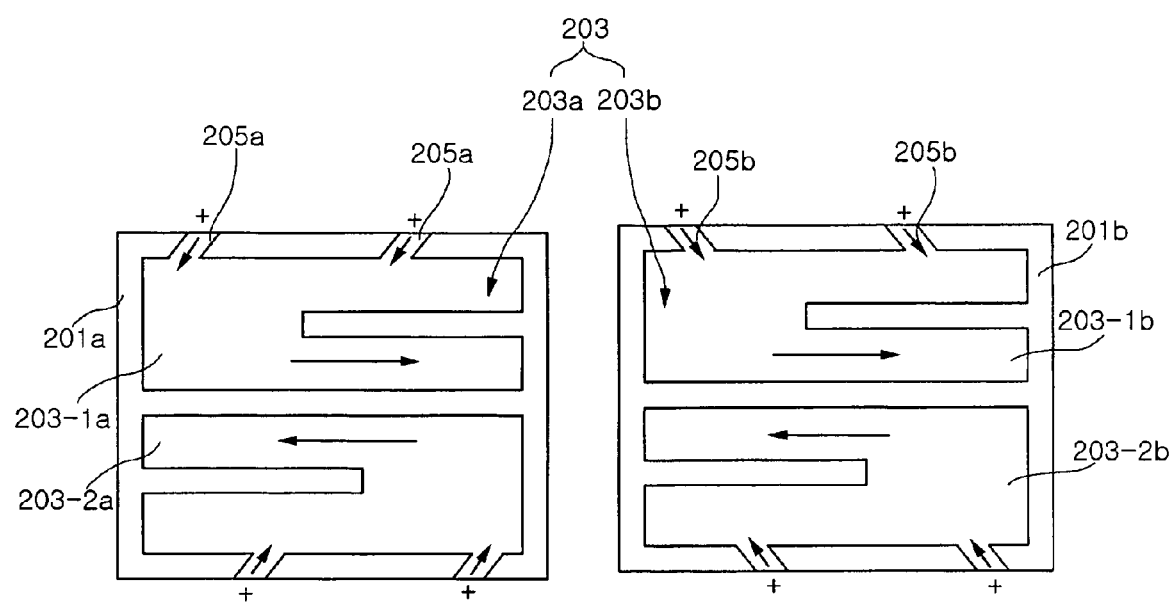
FIGS. 7a and 7b are plan views illustrating the configuration of internal electrodes of a multilayer chip capacitor according to a first embodiment of the invention.
Figure 7B:
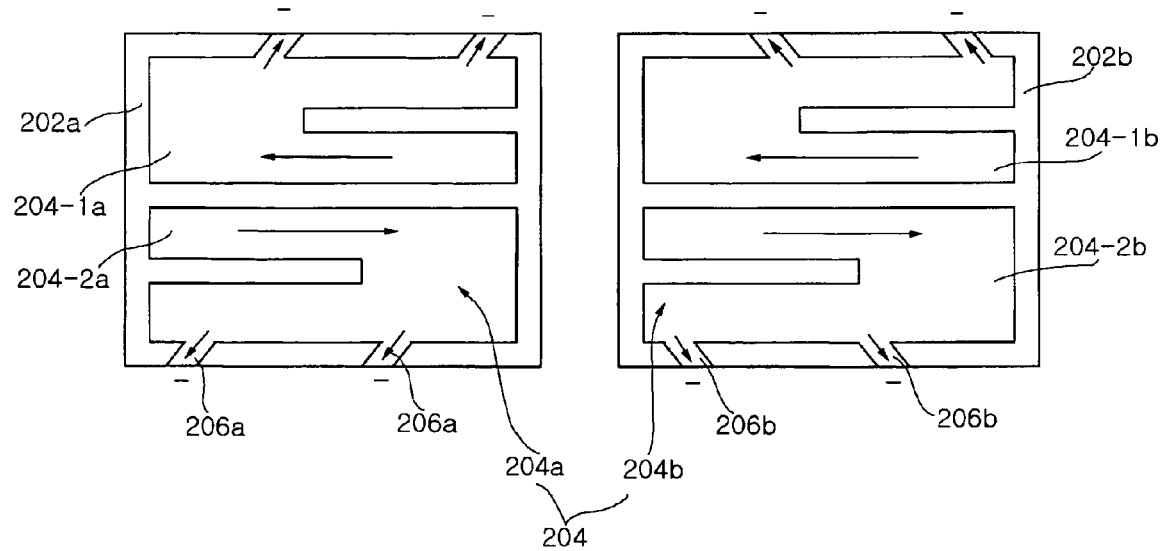

FIGS. 7a and 7b are plan views illustrating internal electrodes of the capacitor according to a first embodiment of the invention. Referring to FIGS. 7a and 7b, first internal electrodes 203a, 203b include four leads 205a, 205b connected to external electrodes, respectively, and second electrodes 204a, 204b include four leads 206a, 206b connected to external electrodes, respectively. Reference numerals 201a, 201b, 202a and 202b depict dielectric layers. The leads 205a and 205b of the first internal electrodes 203 are adjacent to the leads 206a and 206b of the second internal electrode 204a and 206b with the opposite polarity, thereby canceling magnetic flux generated by respective high-frequency currents. In addition, currents flow in opposite directions in the leads 205a and 205b or the leads 206a and 206b which are adjacent to each other, thereby inhibiting occurrence of strong mutual inductance.

Respective first internal electrodes 203a and 203b have separated first conductive patterns 203-1a and 203-1b and second conductive patterns 203-2a and 203-2b disposed in parallel on the same plane. The first conductive patterns 203-1a and 203-1b and the second conductive patterns 203-2a and 203-2b on the same plane have the same polarity, e.g., (+). Also, currents flow in opposite directions in adjacent areas of the first conductive patterns 203-1a, 203-1b and second conductive patterns 203-2a, 203-2b on the same plane, thereby leading to cancellation of magnetic flux. Likewise, the second internal electrodes 204a and 204b have separated first conductive patterns 204-1a, 204-1b and second conductive patterns 204-2a, 204-2b disposed adjacent to each other, thereby resulting in cancellation of magnetic flux.

Each of the first conductive patterns and the second conductive patterns has a slit extending from one side of the conductive pattern toward a central portion of the conductive pattern. Therefore, currents flow in opposite directions between adjacent paths in a conductive pattern, thereby canceling magnetic flux within the conductive pattern. This further reduces ESL.

The slit lengthens a current path inside the each conductive pattern, thereby preventing excessive decline in ESR. Also, ESR can be adequately controlled by adjusting the slit length. In this fashion, control of ESR allows a target impedance to be satisfied and a power distribution network to be designed stably.

In the aforesaid embodiment, a conductive pattern has one slit formed therein but at least two slits may be present therein. Additionally, in place of two conductive patterns on the same plane, only a conductive pattern may be formed. The number of the leads formed in the respective internal electrodes may be more than 4.

Figure 8A:
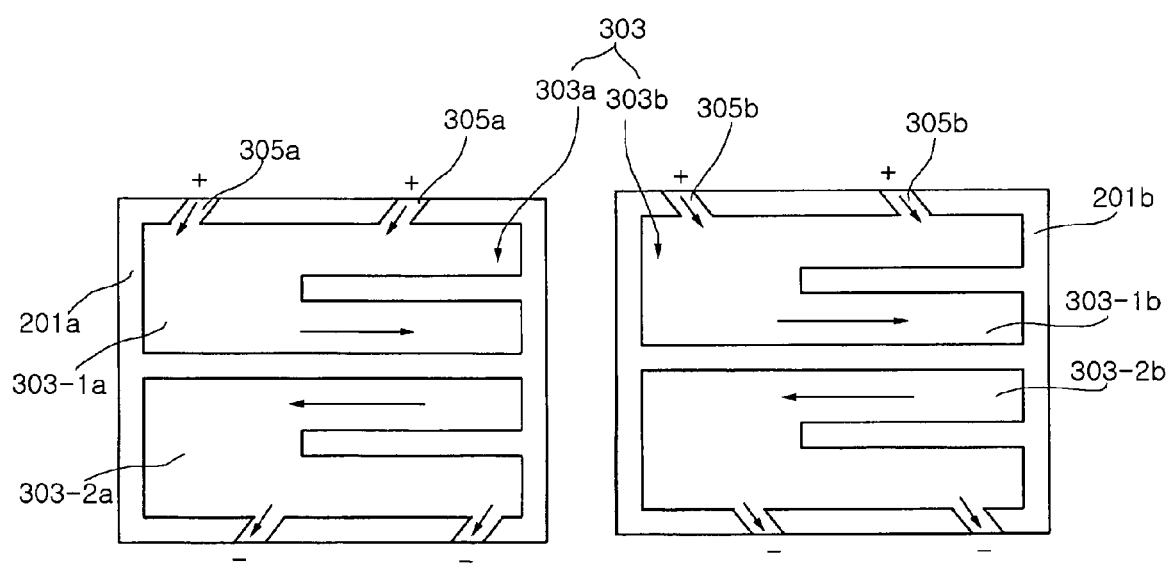
FIGS. 8a and 8b are plan views illustrating the configuration of internal electrodes of a multilayer chip capacitor according to a second embodiment of the invention.
Figure 8B:
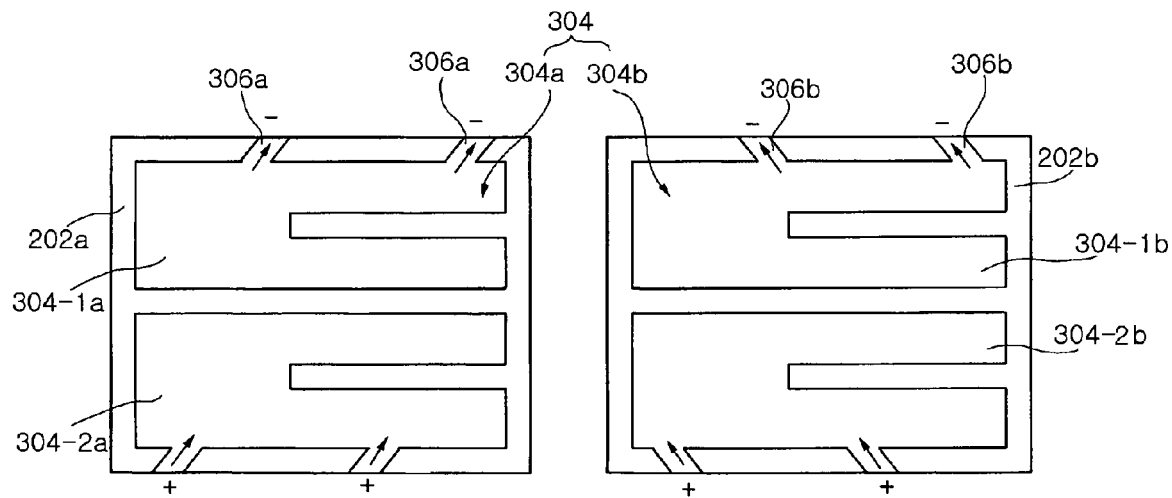

FIGS. 8a and 8b are plan views illustrating the configuration of internal electrodes of a capacitor according to a second embodiment. Referring to FIGS. 8a and 8b, first conductive patterns 303-1a, 303-1b, 304-1a and 304-1b and second conductive patterns 303-2a, 303-2b, 304-2a and 304-2b are shown, in which those formed on the same plane (e.g., the conductive patterns 303-1a and 303-2a) exhibit the opposite polarity. Reference numerals 303a and 303b denote first internal electrodes 303 while reference numerals 304a and 304b denote second internal electrodes 304. As indicated with an arrow in FIGS. 8a and 8b, in this embodiment, currents flow in opposite directions in adjacent areas between the first conductive patterns and second conductive patterns on the same plane, between vertically adjacent leads having the opposite polarity (e.g., 305a and 306a) and inside a conductive pattern, thereby cancelling magnetic flux. Further, currents flow in opposite directions through the vertically adjacent leads having the same polarity (e.g., 305a and 305b). Moreover, ESR can be adequately controlled through the slit formed in the respective conductive patterns.

According to embodiments of the invention, currents may flow in perpendicular directions between the vertically adjacent first internal electrodes and second internal electrodes. FIGS. 9a to 12b illustrate examples thereof.

Figure 9A:
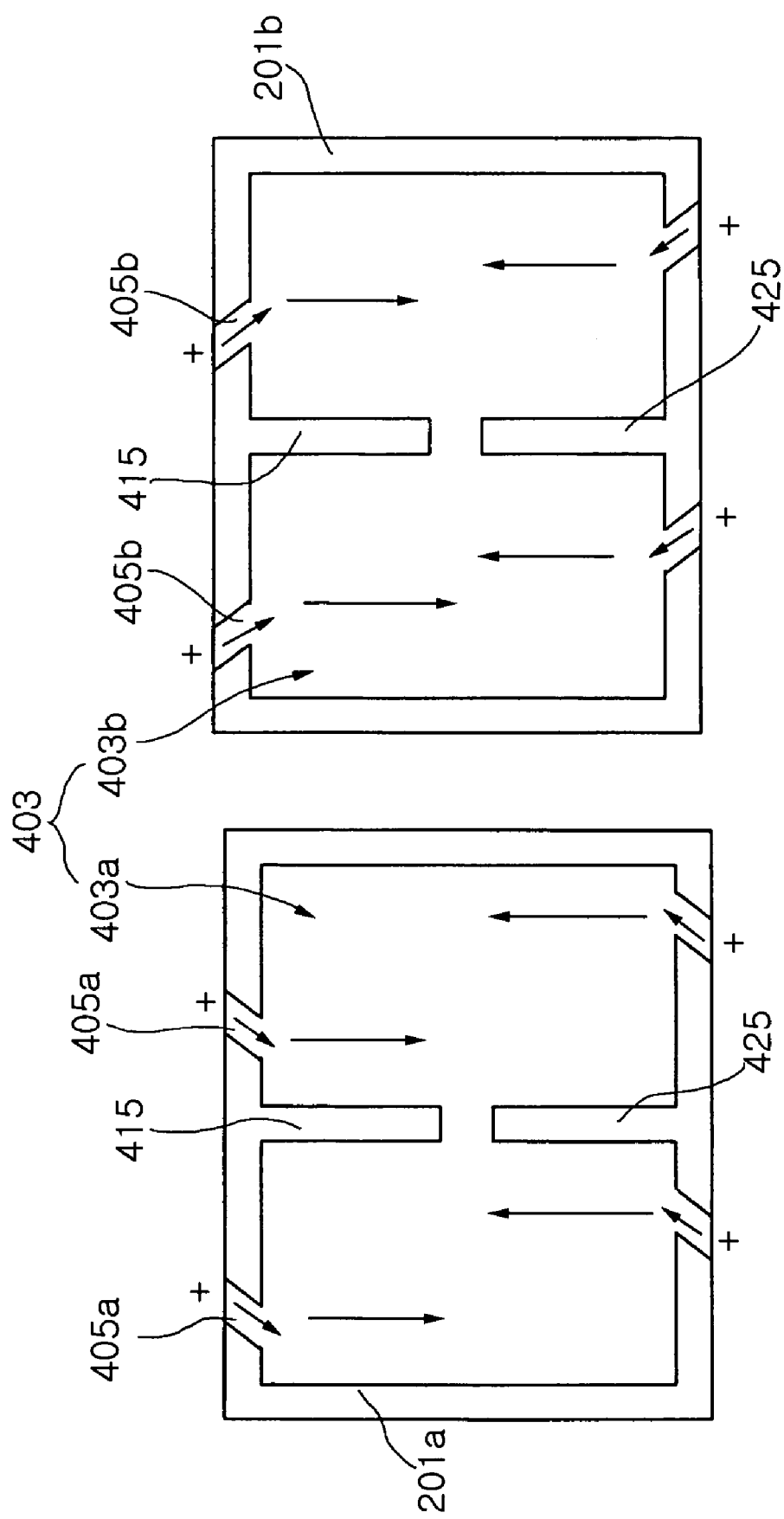
FIGS. 9a and 9b are plan views illustrating the configuration of internal electrodes of a multilayer chip capacitor according to a third embodiment of the invention.
Figure 9B:
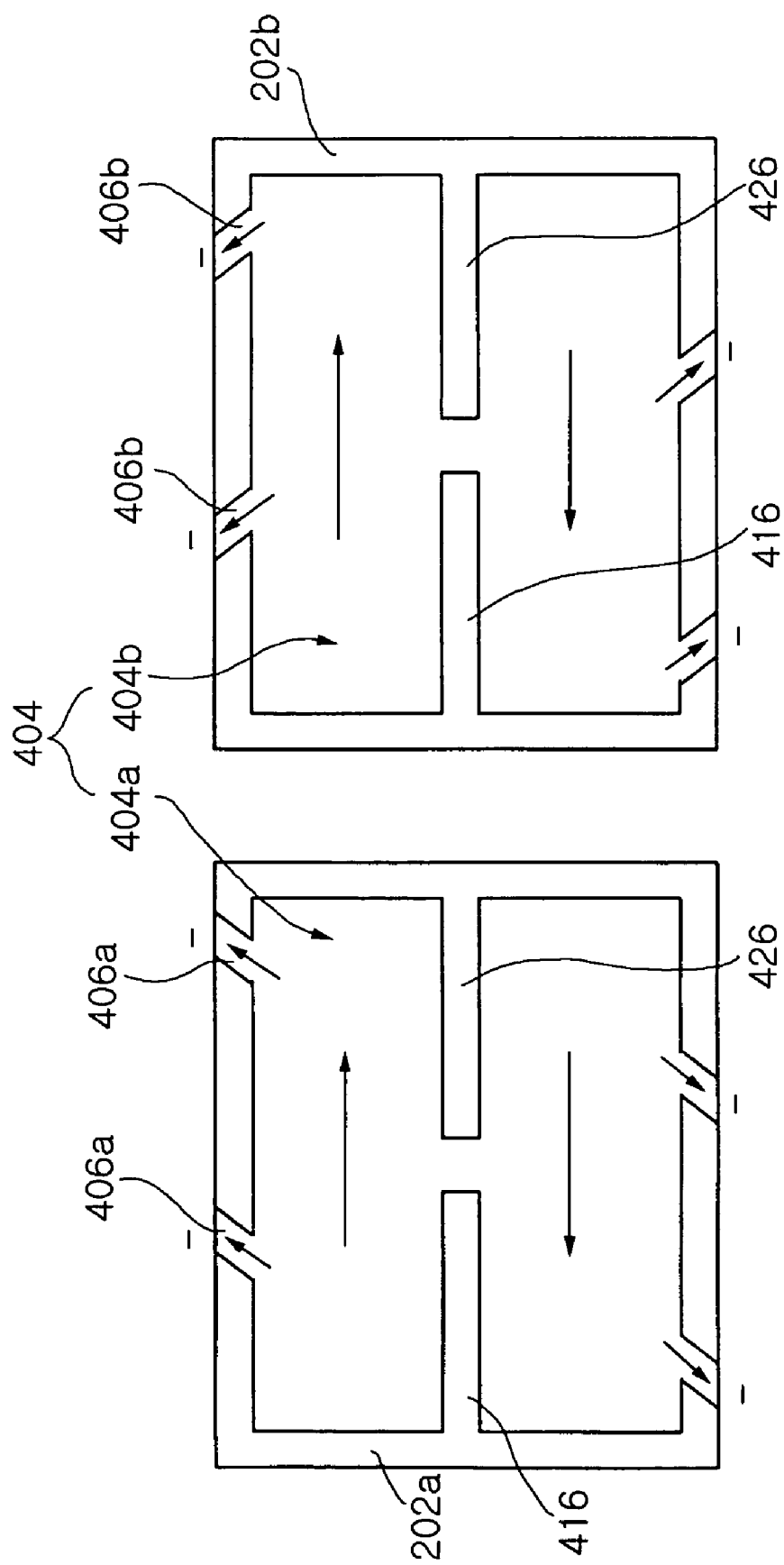

FIGS. 9a and 9b illustrate the configuration of internal electrodes of a capacitor according to a third embodiment of the invention. Referring to FIGS. 9a and 9b, respective first internal electrodes 403 (403a and 403b) and respective second internal electrodes 404 (404a and 404b) have one conductive pattern formed therein. Also, two collinear slits 415 and 425 are formed in the first internal electrodes 403, and another two collinear slits 416 and 426 are formed in the second internal electrodes 404. At this time, the slits 415 and 425 of the conductive patterns of the first internal electrodes 403 are perpendicular to the slits 416 and 426 of the conductive patterns of the second internal electrodes 404. Currents flow in perpendicular directions between the vertically adjacent first internal electrodes 403 and second internal electrodes 404, thereby leading to cancellation of magnetic flux. Moreover, currents flow in opposite directions through vertically adjacent leads having the same polarity such as the leads 405a and 405b or the leads 406a and 406b.

Figure 10A:
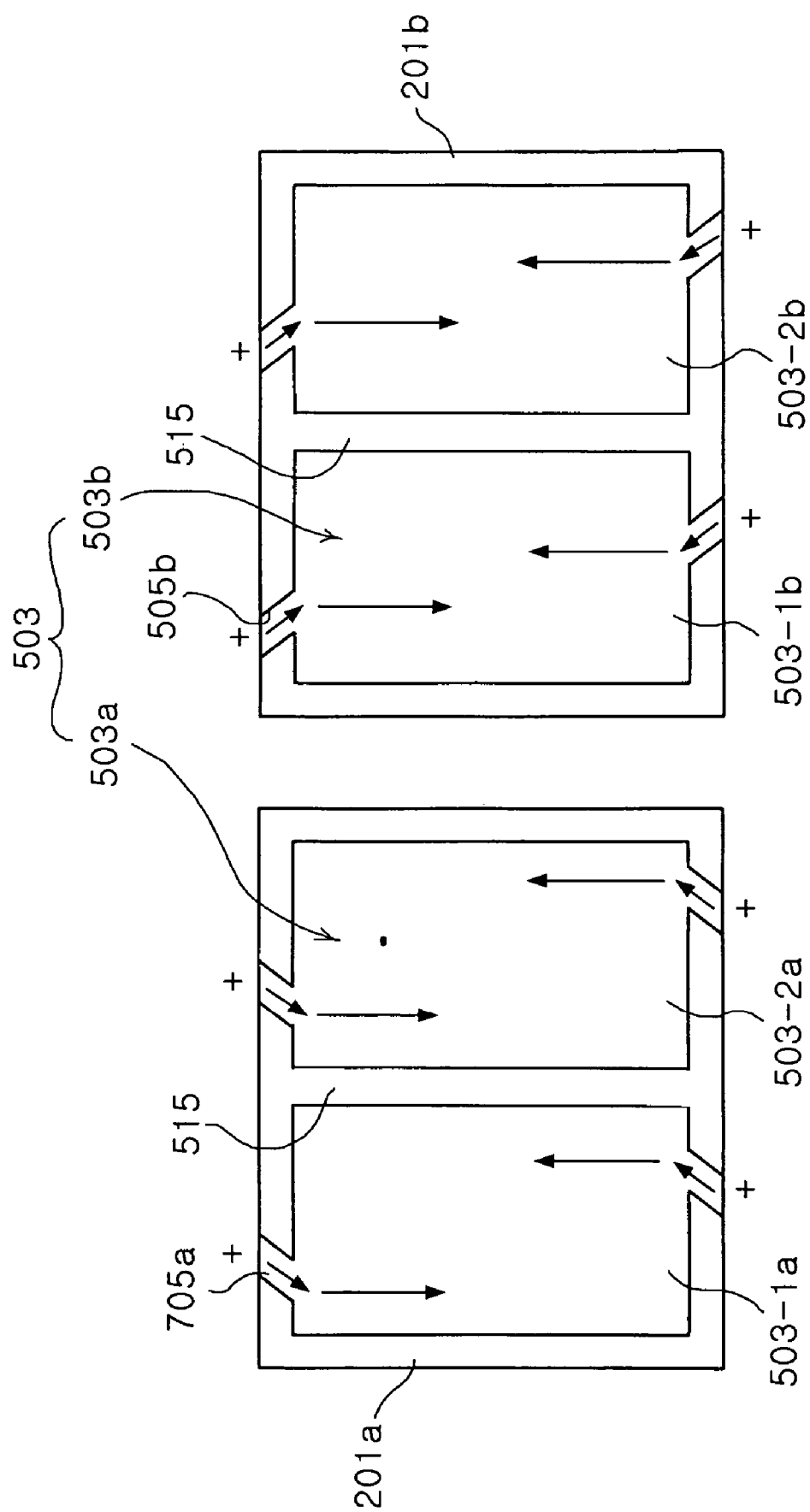
FIGS. 10a and 10b are plan views illustrating the configuration of internal electrodes of a multilayer chip capacitor according to a fourth embodiment of the invention.
Figure 10B:
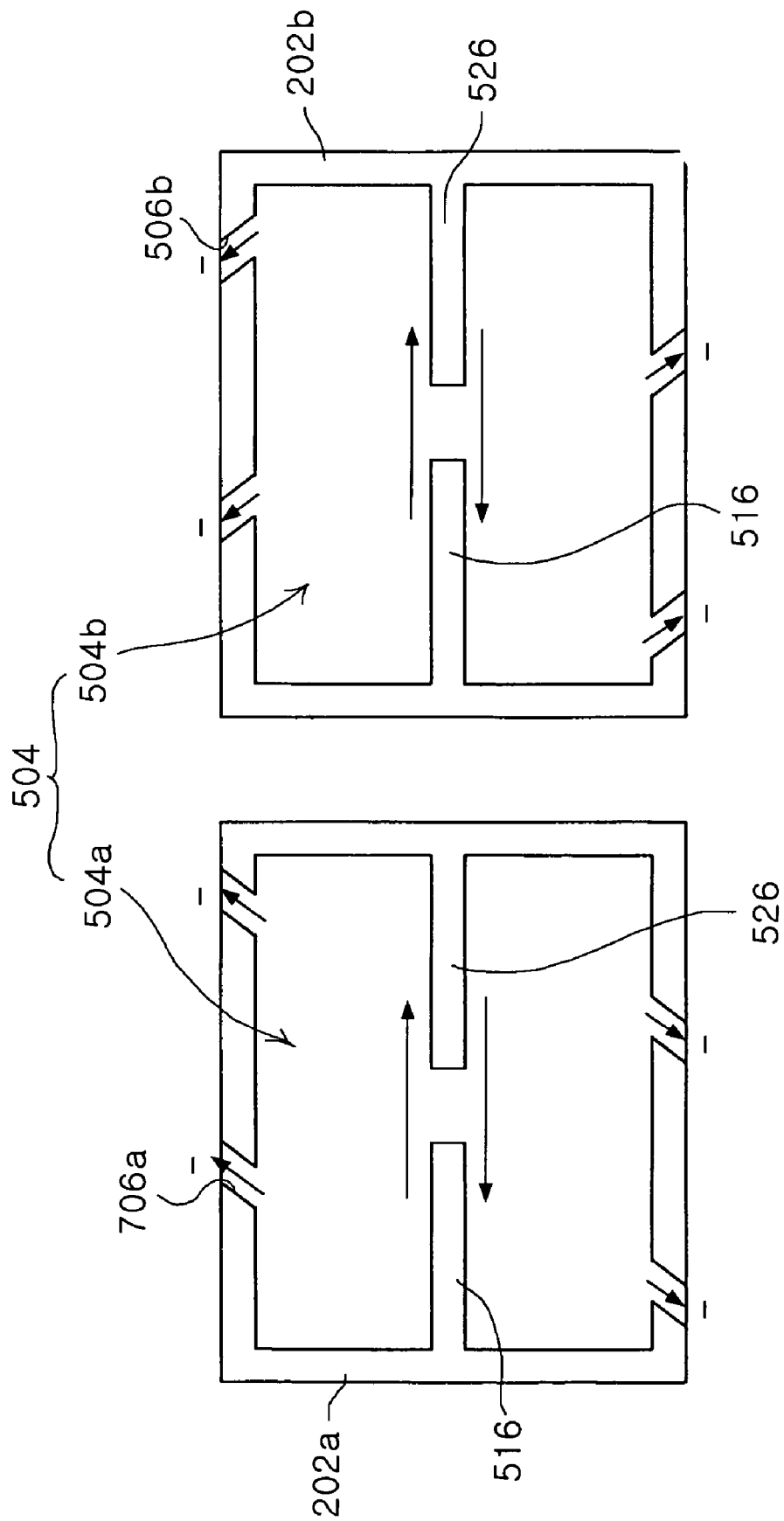

FIGS. 10a and 10b illustrate the configuration of internal electrodes of a capacitor according to a fourth embodiment of the invention. Referring to FIGS. 10a and 10b, respective first internal electrodes 503 (503a, 503b) have two conductive patterns 503-1a and 503-2a (in case of 503a) or 503-1b and 503-2b (in case of 503b) divided by a slit 515. Also, respective second internal electrodes 504 (504a, 504b) have a conductive pattern with two collinear slits 516 and 526. At this time, a slit 515 of the first internal electrodes 503 crosses perpendicularly slits 516 and 526 of the second internal electrodes 504. Currents flow in perpendicular directions between vertically adjacent ones of the first internal electrodes 503 and the second internal electrodes 504 so that magnetic flux is cancelled. Furthermore, currents flow in opposite directions through the vertically adjacent leads having the same polarity such as the leads 505a and 505b or the leads 506a and 506b.

Figure 11A:
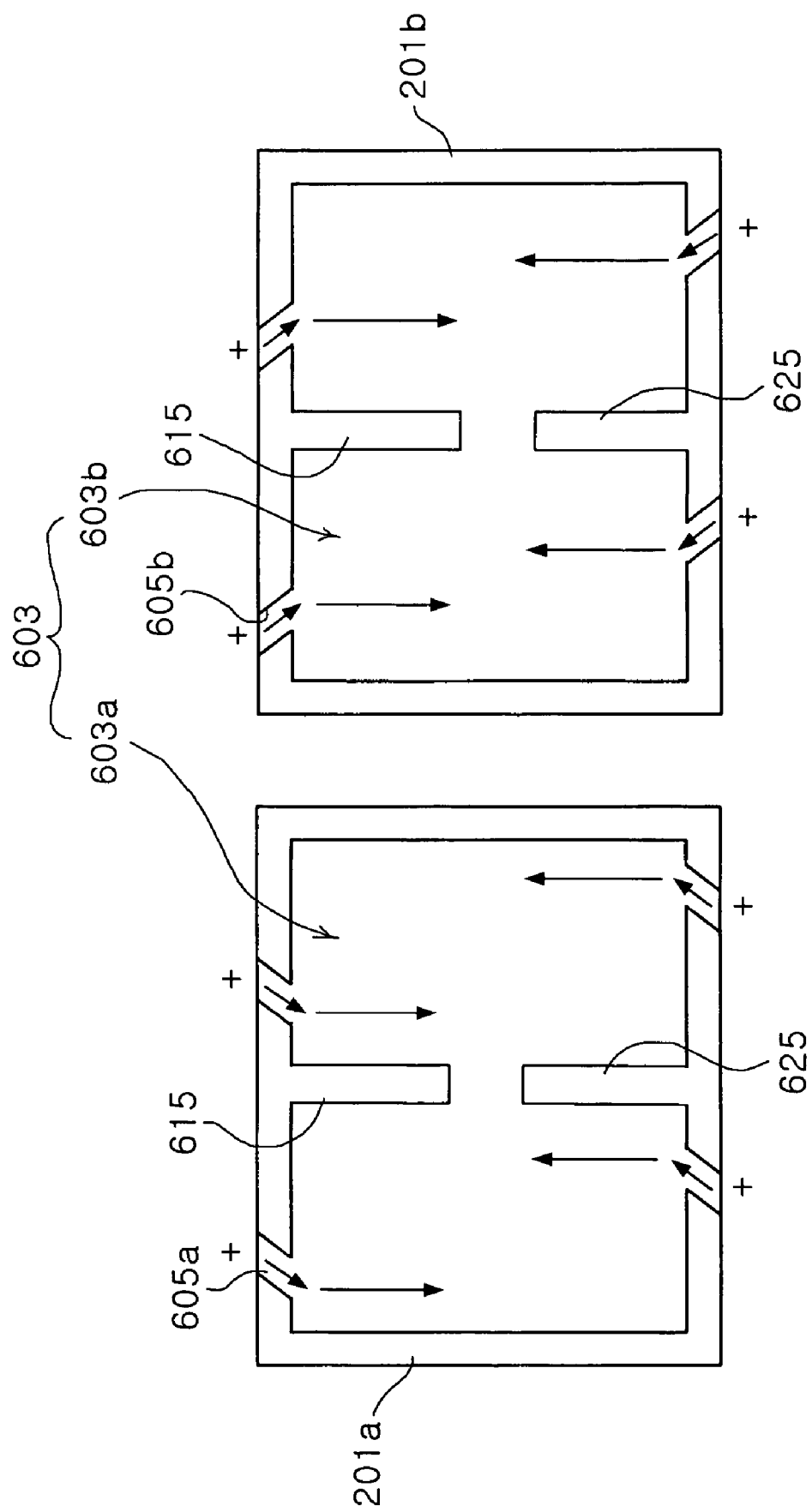
FIGS. 11a and 11b are plan views illustrating the configuration of internal electrodes of a multilayer chip capacitor according to a fifth embodiment of the invention.
Figure 11B:
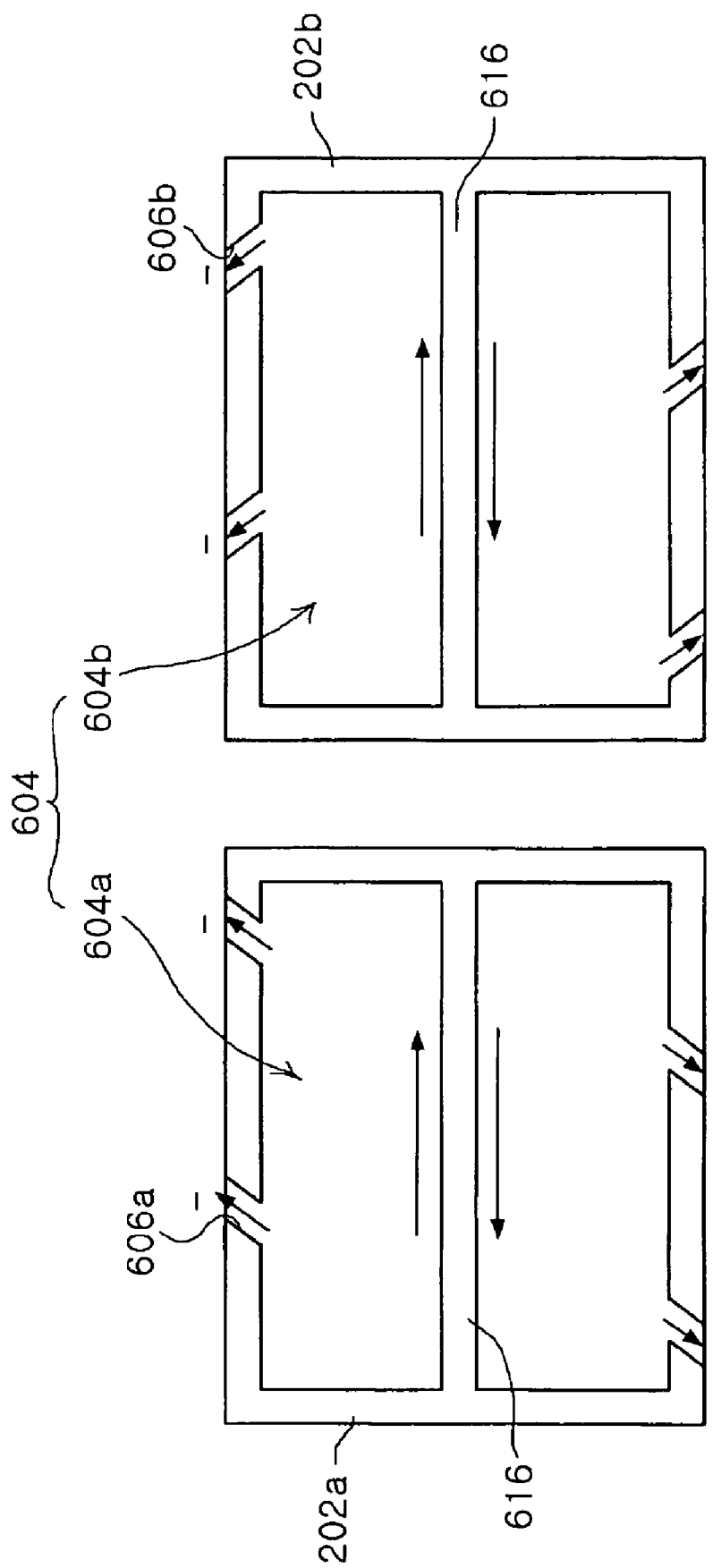

FIGS. 11a and 11b are plan views illustrating the configuration of internal electrodes of a capacitor according to a fifth embodiment of the invention. Referring to FIGS. 11a and 11b, respective first internal electrodes 603 (603a, 603b) include a conductive pattern having two slits 615 and 625 formed on the same plane. Respective second internal electrodes 604 (604a, 604b) have two conductive patterns divided by a slit 616. At this time, slits 615 and 625 of the first internal electrode 603 cross perpendicularly a slit 616 of the second internal electrode 604. Therefore, currents flow in perpendicular directions between the vertically adjacent ones of the first internal electrodes 603 and second internal electrodes 604, resulting in cancellation of magnetic flux. Additionally, currents flow in opposite directions through the vertically adjacent leads having the same polarity such as the leads 605a and 605b or the leads 606a and 606b.

Figure 12A:
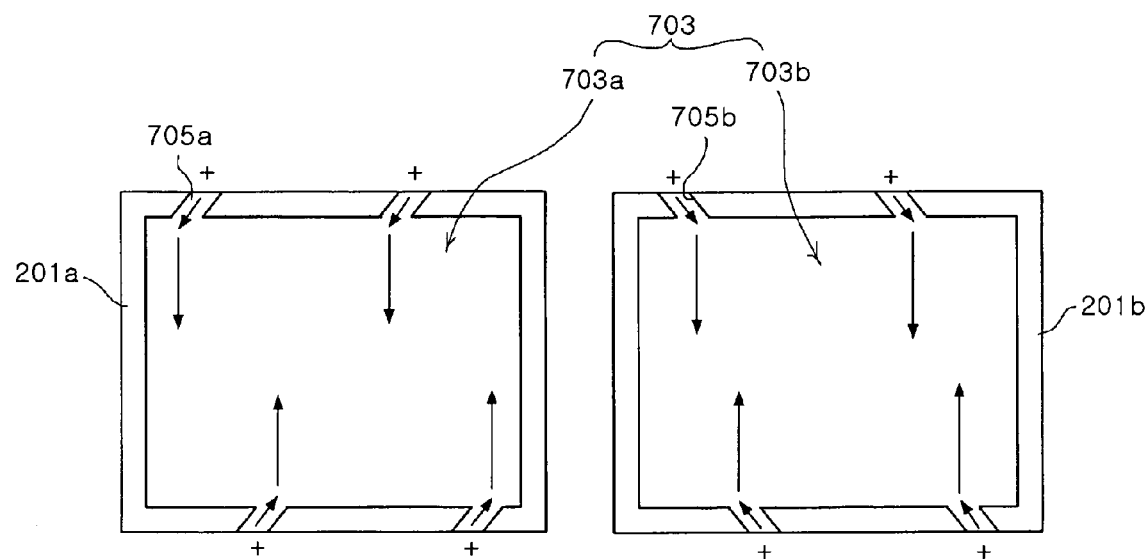
FIGS. 12a and 12b are plan views illustrating the configuration of internal electrodes of a multilayer chip capacitor according to a sixth embodiment of the invention.
Figure 12B:
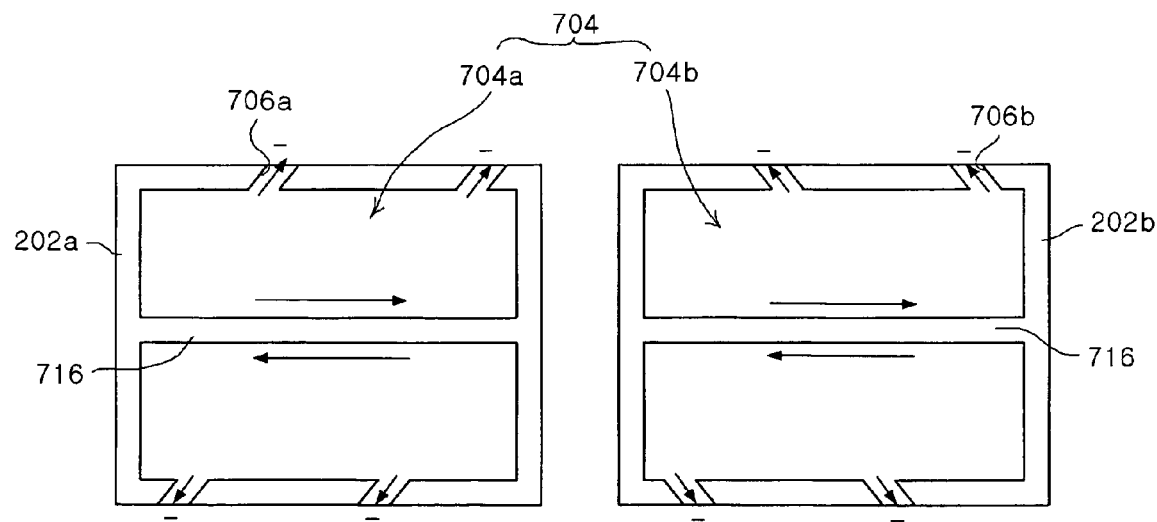

FIGS. 12a and 12b are plan views illustrating the configuration of internal electrodes of a capacitor according to a sixth embodiment of the invention. Referring to FIGS. 12a and 12b, respective first internal electrodes 703 (703a, 703b) have a rectangular conductive pattern with no slit formed therein. Respective second internal electrodes 704 (704a, 704b) have a pair of conductive patterns divided by a slit 716. Currents flow in perpendicular directions between the vertically adjacent first internal electrodes 703 and second internal electrodes 704, consequently canceling magnetic flux. Moreover, currents flow in opposite directions through vertically adjacent leads having the same polarity such as the leads 705a and 705b or the leads 706a and 706b.

As set forth above, according to preferred embodiments of the invention, adjacent leads having the same polarity extend in different directions at a predetermined angle. This allows currents to flow in different directions through the leads. Eventually, this ensures magnetic flux to be cancelled and prevents mutual inductance from occurring as in the prior art. Therefore, ESL of a multilayer chip capacitor further diminishes. In addition, at least one slit formed in internal electrodes prevents excessive decline in ESR and ensures a proper control of ESR. As a result, a target impedance can be easily met and a power distribution network can be stably designed.

While the present invention has been shown and described in connection with the preferred embodiments, it will be apparent to those skilled in the art that modifications and variations can be made without departing from the spirit and scope of the invention as defined by the appended claims.

What is claimed is:

1. A multilayer chip capacitor comprising:
   a capacitor body having a plurality of dielectric layers stacked in a thickness direction;
   a plurality of first and second internal electrodes separated from one another by the dielectric layers within the capacitor body, each of the first internal electrodes opposing each of the second internal electrodes, each of the first and second internal electrodes including at least two leads extending toward any side of the capacitor body;

a plurality of external electrodes formed on an outer surface of the capacitor body and connected to the internal electrodes via the leads, wherein vertically adjacent ones of the leads having the same polarity extend in different directions at a predetermined angle, and wherein the leads of the first internal electrodes are disposed adjacent to and alternate with those of the second internal electrodes.

2. The multilayer chip capacitor according to claim 1, wherein the vertically adjacent leads of the same polarity extend in different directions at an angle of 45 degree.

3. The multilayer chip capacitor according to claim 1, wherein the vertically adjacent leads of the same polarity extend in different directions at a right angle.

4. The multilayer chip capacitor according to claim 1, wherein the capacitor body includes an upper dummy layer and a lower dummy layer, wherein the first and second internal electrodes are disposed between the upper and lower dummy layers, and wherein the lower dummy layer has a thickness smaller than that of the upper dummy layer.

5. The multilayer chip capacitor according to claim 4, wherein the thickness ratio of the lower dummy layer to the upper dummy layer is 0.8 or less.

6. The multilayer chip capacitor according to claim 4, wherein the capacitor body has a marking formed on an upper surface thereof, for distinguishing the upper surface from a lower surface of the capacitor.

7. The multilayer chip capacitor according to claim 1, wherein at least one of the first and second internal electrodes has at least one slit formed therein.

8. The multilayer chip capacitor according to claim 7, wherein each of the first and second internal electrodes comprises a pair of separated conductive patterns disposed adjacent to each other, wherein each of the pair of conductive patterns has at least one slit extending from at least one side of the conductive pattern toward a central portion of the conductive pattern so as to change current flow within the conductive pattern, and wherein currents flow in opposite directions in adjacent areas of the pair of conductive patterns.

9. The multilayer chip capacitor according to 8, wherein the pair of conductive patterns have the same polarity.

10. The multilayer chip capacitor according to claim 8, wherein the pair of conductive patterns have the opposite polarity.

11. The multilayer chip capacitor according to claim 7, wherein currents flowing in the first and second internal electrodes cross each other perpendicularly.

12. The multilayer chip capacitor according to claim 11, wherein each of the first internal electrodes has a rectangular first conductive pattern with two slits extending from two opposing sides of the first conductive pattern toward a central portion of the first conductive pattern, and wherein each of the second internal electrodes has a rectangular second conductive pattern with two slits extending from two opposing sides of the second conductive pattern toward a central portion of the second conductive pattern, the slits of the second internal electrodes crossing perpendicularly the slits of the first internal electrodes.

13. The multilayer chip capacitor according to claim 11, wherein each of the first internal electrodes has a pair of first conductive patterns divided by a first slit, and wherein each of the second internal electrodes has a rectangular second conductive pattern with two second slits extending from two opposing sides of the second conductive pattern toward a central portion of the second conductive pattern, the second slits crossing perpendicularly the first slits.

14. The multilayer chip capacitor according to claim 11, wherein each of the first internal electrodes has a first conductive pattern, and wherein each of the second internal electrodes has a pair of second conductive patterns divided by a slit.

* * * * *